United States Patent

Schmidt et al.

[11] 3,881,233
[45] May 6, 1975

[54] ROLLER FOR HEAVILY LOADED ROLL TABLES AND RELATED METHOD

[75] Inventors: Ernest Schmidt; Helmut Licht, both of Bochum; Willi Kasper, Wattenscheid, all of Germany

[73] Assignee: Fried, Krupp Huttenwerke AG

[22] Filed: Sept. 3, 1974

[21] Appl. No.: 502,397

[30] Foreign Application Priority Data
Sept. 1, 1973 Germany.......................... 2344236

[52] U.S. Cl. ........................ 29/110; 29/126; 29/130
[51] Int. Cl. ............................................ B21b 13/02
[58] Field of Search ............ 29/110, 124, 126, 130, 29/132

[56] References Cited
UNITED STATES PATENTS

| | | | |
|---|---|---|---|
| 1,928,763 | 10/1933 | Rosenberg | 29/130 X |
| 2,063,189 | 12/1936 | Ladd | 29/130 X |
| 2,254,501 | 9/1941 | Solem | 29/126 X |
| 2,761,547 | 9/1956 | Gehrer | 29/126 X |
| 3,522,643 | 8/1970 | Winkler | 29/130 |

FOREIGN PATENTS OR APPLICATIONS 1,076,499  7/1967  United Kingdom.................. 29/110

*Primary Examiner*—Alfred R. Guest

[57] ABSTRACT

A roller is provided for heavily loaded roll tables, such as employed for blooms and slabs in rolling mills. The roller includes a rotatable shaft with a shell of wear-resistant material encircling the same and connected thereto by arrangements consisting of concentric metal rings having a resilient material therebetween. The resilient material is in the form of moldings under prestress in a radial sense.

6 Claims, 4 Drawing Figures

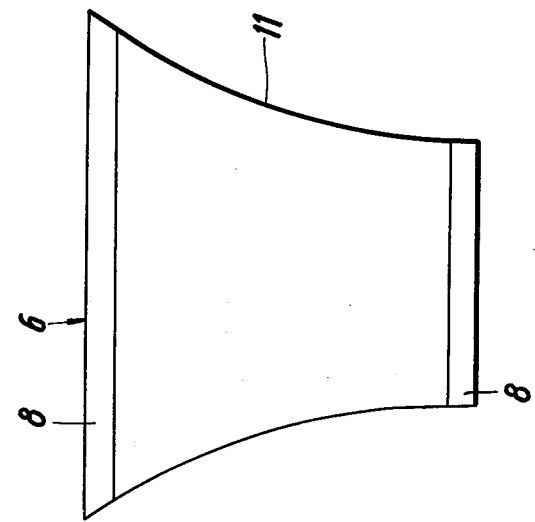
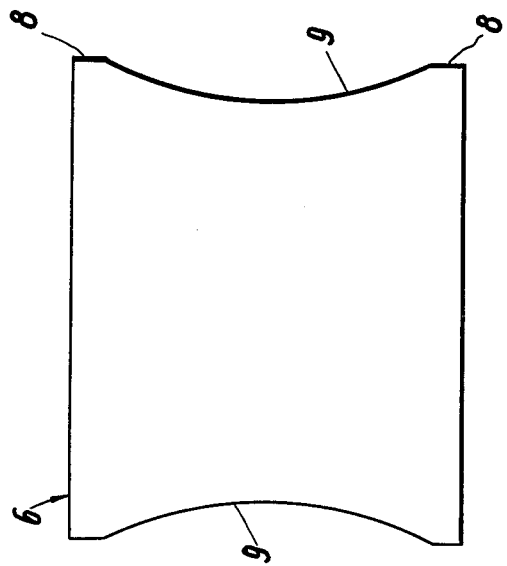

3,881,233

ROLLER FOR HEAVILY LOADED ROLL TABLES AND RELATED METHOD

FIELD OF THE INVENTION

This invention relates to rollers for heavily loaded tables such as for slabs and blooms in rolling mills.

BACKGROUND

Due to heavy strain, rollers such as, for example, those provided for cold roller beds for slabs and blooms in rolling mills are rapidly damaged, especially at their bearings and in their bedplates.

SUMMARY OF THE INVENTION

It is an object of the invention to provide constructional features for a roller which has to absorb heavy shock loads, contributing thus to a reduction of damages thereto.

This object is achieved by the provision of a roller for a heavily loaded roll table, such as roller mill roller beds for blooms and slabs, said roller comprising a rotatable shaft, a shell of wear-resistant material adapted for being connected with said rotatable shaft, concentric metal rings, moldings of resilient material arranged radially under prestress between said metal rings to form an arrangement between the shaft and the shell at least in two end regions of the shell, said rings being united firmly with the shell and shaft respectively.

As a feature of the invention, the aforesaid moldings may be of segmental construction and arranged with a slight tangential clearance between the rings.

As a further feature of the invention, at least one further arrangement constituted the same as the first said arrangement, may be arranged consecutively in axial alignment therewith.

As still another feature of the invention, a firm union may be provided between one of the rings and shell and the other ring and the shaft, the union being in the form of a shear-resistant bond.

Other features of the invention include without limitation, that the molding is formed of caoutchouc and that the moldings include abutting planar and peripheral beads webbed together by a concavity.

In accordance with the invention, there is provided a method by which the aforesaid construction is prepared by bonding some of the annular members first at one end of the shaft and other of the annular members at the other end of the shell inserting the shaft into the shell and cementing the shaft and shell to each other.

The metal rings in the above are preferably of steel and the individual moldings of a caoutchouc having a high Shore hardness. Embedding of the moldings is effected through the shoulders of two concentric steel rings axially bounding the prestressed moldings. The whole unit is hereinafter described as an annular member. The fitting of this annular member can be effected by means of a device such as disclosed in German Pat. No. 947,288. By these means, the outer ring is centered onto the upper band or segmented ring of the known arrangement and the elastic moldings embedded with identical clearance into the annular slot between the shoulders. A conical member is then drawn by a hydraulic press concentrically into the open space formed by the moldings. In this way, the moldings are radially prestressed and at the same time the inner ring can be brought home while leaving the requisite residual initial stress unchanged or under loading of the requisite residual initial stress.

Preferably the molded members are of segmental design and arranged with a slight tangential clearance in the annular member. The moldings are at the same time distributed symmetrically onto the periphery of the annular member and the tangential clearance allows the rubber members to shift tangentially with a radial stress, that is to say an impact or sudden load, and thus absorb the shock. Initial height and the radial prestress of the individual members are so selected that the radial springiness or resilience sought for reduction of impact is obtained. In blooming rolls, a spring deflection of approximately 10 mm (0.394 in.) is required.

In one especially preferred embodiment, several annular members are arranged consecutively in axial alignment at a given time. Thereupon, the individual annular members fit together in axial alignment with their outer plane surfaces abutting. The advantage of a plurality of annular members consists of space being provided again for shifting of the individual moldings in axial alignment, thanks to the clearance of the individual members. The extreme annular member is effectively kept in its position by a spacer which at the same time prevents the penetration of dirt, heat and oil.

Preferably the tight connection between ring and shell or ring and axis is provided by a shear-resistant binder. This metal-to-metal binder can be an adhesive of one component or two components. Good results have been obtained with cold-setting dual-component binders.

In making the bond, the practical procedure is first to bond the annular members with the axle at one end and the annular members with the shell at the other end and, after the setting of the adhesive, to push the shell and axle into each other and cement them. This procedure has the advantage that, when the prefabricated individual parts are encased, the roller centers itself.

As a further possibility for firm union between annular members and the roller or shell, known axial and transverse bondings by pressure such as extrusion and contraction could be used.

BRIEF DESCRIPTION OF THE DRAWING

The invention is next described in greater detail hereunder with the aid of the accompanying drawing in which:

FIGS. 3a and 3b are front and side elevational views respectively of the individual molding.

DETAILED DESCRIPTION

Figure 1:
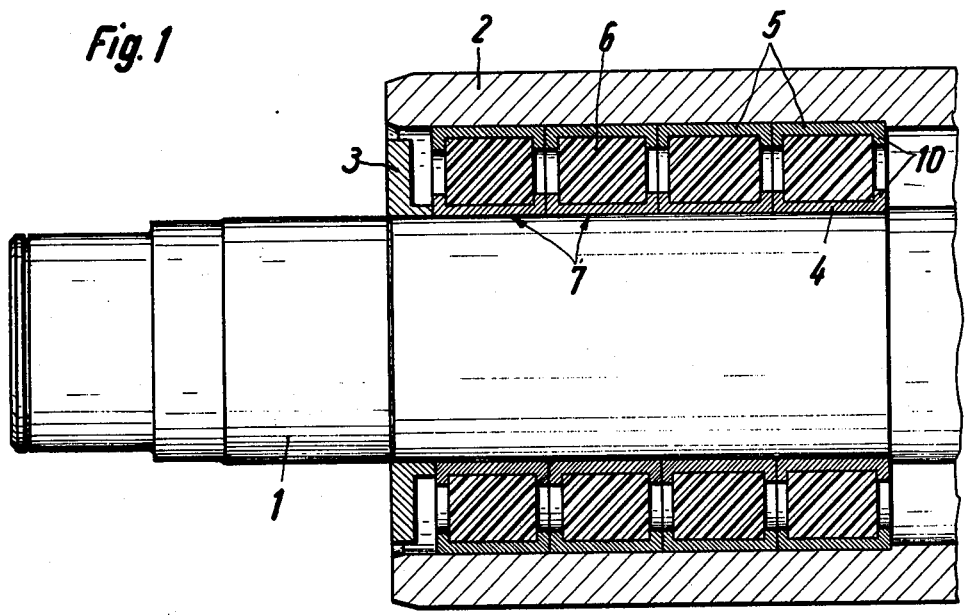
FIG. 1 is a fragmentary view in longitudinal section of a roller provided in accordance with one embodiment of the invention.

The roller shown in FIG. 1 has a shaft 1 with a steel wear-resistant shell 2. Contrary to the state of the art, shell 2 and shaft 1 are not rigidly joined together, but are joined through a springy annular member 7. Annular member 7 consists of an inside ring 4 and an outside ring 5. Both of the rings 4 and 5 have shoulders trimmed respectively therein. Rings 4 and 5 are joined together by prestressed molded members made of a caoutchouc having a high Shore hardness.

Figure 2:
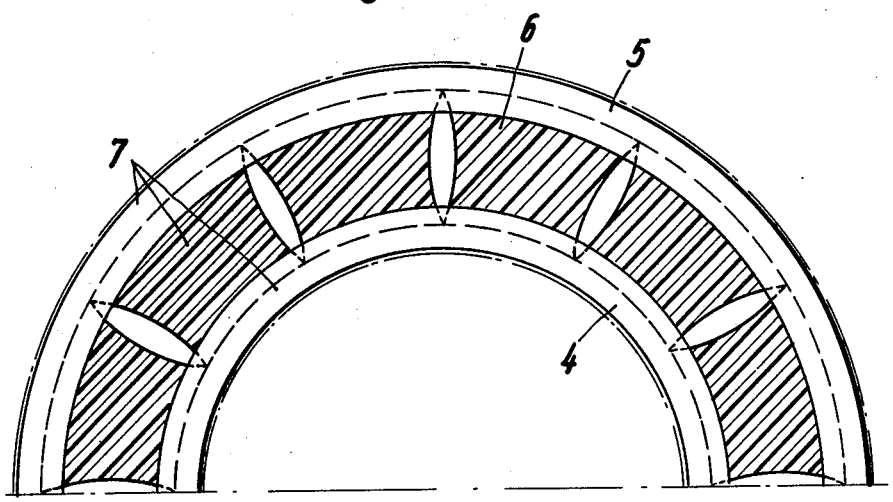
FIG. 2 is a fragmentary front view of the annular member.

As FIG. 2 illustrates, a plurality of moldings 6 is provided in distribution around the periphery of the annular member 7. They are arranged with a slight tangential clearance from one another. It is a matter of importance that the moldings 6 in the fully restrained position in tangential alignment lie with concave surfaces facing each other.

A molding such as that shown in nonprestressed condition in FIGS. 3a and 3b fulfills this requirement. As the side elevation in FIG. 3b illustrates, the individual molding 6 has plane beads 8 which are webbed together through a concavity 9. The plane beads 8 provide that a fully tight application is obtained at the shoulders of the rings 4 and 5 without terminal extrusion. It has been shown that the proposed bonding between the metal parts as described in the invention is adequately resistant to shear and, beside the radial reduction of impact, adequate torsional resilience is also provided at the same time because of the prestressed moldings. These rollers lead to a considerable reduction of the damages hitherto observed.

In accordance with the method of the invention, some of the annular members 7 are first bonded at one end of the shaft 1 and at the other end of the shell 2, the remainder of the annular members are bonded. After the setting of the bonding adhesive which is preferably a shear-resistent bond, the shell 2 and shaft 1 are encased and cemented to each other.

In the above, the material for moldings 6 preferably has a Shore hardness of 80 to 85. Such moldings are available, for example, from the German Firm Continental, Hannover. For low temperatures (max. 90° C), Natural Rubber Conti B V R N may be used. For higher temperatures (about 150° C), Synthetic Rubber Conti Y F 801 is used.

The bond in the above mentioned example was a coldsetting dual-component binder of the firm Ciba-AG. The name of adhesive is AB 124 and the name of the setting medium is HV 948. These components were applied to the cleaned and grease-free metal surfaces in a uniform coating-thickness of 0.1 mm (0.0039 in.) in the ratio 1 : 1. The setting time amounted to approximately 24 hours.

There will now be obvious to those skilled in the art many modifications and variations of the structure and method set forth hereinabove. There modifications and variations will not depart from the scope of the invention if defined by the following claims.

What is claimed is:

1. A roller for heavily loaded roll tables, such as rolling mill roller beds for blooms, said roller comprising a rotatable shaft, a shell of wear-resistant material connected with said rotatable shaft, concentric metal rings, moldings of resilient material arranged radially under prestress between said metal rings to form an arrangement between the shaft and the shell at least in two end regions of the shell, said rings being united firmly with the shell and the shaft respectively.

2. A roller as claimed in claim 1, wherein the moldings are of segmental construction and arranged with a slight tangential clearance between the rings.

3. A roller as described in claim 1 comprising at least one further arrangement constituted as the first said arrangement and arranged consecutively in axial alignment therewith.

4. A roller as claimed in claim 1 comprising a firm union between one of said rings and said shell and the other ring and said shaft and in the form of a shear-resistant bond.

5. A roller as claimed in claim 1 wherein the moldings are of caoutchouc.

6. A roller as claimed in claim 1 wherein the moldings include abutting planar and peripheral beads webbed together by a concavity.

* * * * *